Patented Aug. 9, 1949

2,478,438

UNITED STATES PATENT OFFICE 2,478,438

PRODUCTION OF GUN-PUFFED READY-TO-EAT FOOD PRODUCT

Joseph J. Thompson and William P. Penty, Battle Creek, Mich., assignors to Kellogg Company, Battle Creek, Mich., a corporation of Delaware No Drawing. Application May 27, 1946, Serial No. 672,714

6 Claims. (Cl. 99—82)

This invention relates to the production of ready-to-eat food products of the breakfast cereal type.

More specifically, the present invention relates to the production of gun-puffed composite cereal products wherein two or more cereals or legumes are combined in desirable proportions for such purposes as, for example, to compliment their nutritional properties, to modify their respective deficiencies or excesses, or to neutralize or blend their tastes, and at the same time to provide a desirably sized or shaped product of a crisp, cellular and highly expanded nature generally characteristic of the gun-puffing process.

It is a particular object of our invention to provide a novel and economical process for the production of mixed component gun-puffed products of the foregoing class.

It is, of course, known to gun-puff single component cereal particles, such as whole grains or grits by the general steps of cooking, deforming and gun-puffing at a controlled moisture content. It is also known to gun-puff mixtures of cereals formed by the general steps of cooking a mixture of flours in the form of a dough, extruding the cooked dough into particles of desired shape and gun-puffing the particles. This latter process, at least due to the initial employment of flour, is expensive as contrasted to the cost of employing whole grains or grits as starting material, and generally requires special or specially designed handling equipment and cooking means, such as steam jacketed vessels, heavy duty dough mixers and the like, and other difficulties such as inability to properly or thoroughly cook the cereals due to the nature of the materal, that is the dough, being processed.

As distinguished from the foregoing, the class of starting materials which we employ in the production of our ready-to-eat mixed component gun-puffed food products are whole grains, or grits and the like particles of cereals such as wheat, bran, corn, rye, rice, oats, etc., and legumes such as soya bean. Likewise, although we treat these materials in a novel manner and by a novel sequence of steps, hereinafter more fully described, we are able to employ conventional cereal handling and processing equipment.

It is further recognized that the production of composite toasted or heat-puffed cereal products has been proposed by a process which, for example, comprises the cooking of mixed cereal particles, shredding the mixture and heat-puffing the shreds. The puffing resulting from the toasting process is of a limited nature and essentially one of blistering, as distinguished from the expansion as a whole to several times normal size by gun or explosive puffing. It may also be generally stated that material such as flakes or shreds conditioned for heat-puffing is generally unsuited for gun-puffing, and conversely material conditioned for gun-puffing is generally unsuited in such condition for heat-puffing.

In general our process comprises the steps of (1) cooking a mixture of particles in a rotary steam pressure cooker, (2) compositing the cooked particle material by passing it between flaking rolls, after conditioning it to a proper moisture content, to amalgamate and blend the particles together in the form of generally coherent ribbon-like material generally thinner than conventional flakes, (3) kneading the ribbon-like flaked material with a small amount of added water to form a viscous, plastic, substantially homogeneous mass, and extruding the mass into particles or pellets of desired shape and (4) gun-puffing the pellets, after suitable reduction of moisture content.

The following is a more specific description of our process and the sequence of the steps thereof:

A mixture of two or more materials, in the form of particles such as whole grains, grits, groats, flakes, etc., together with water, and if desired with a flavoring material such as salt, is introduced at one time, or in sequence, to a rotary steam pressure cooker. Cooking is carried out by direct introduction of steam and rotation of the cooker, the cooker being maintained at a steam pressure of from about 15 to about 25 pounds per square inch gauge, so as to permit cooking at an equivalent temperature of from about 250° F. to about 265° F.

The amount of water added to the particles is in proportion to their original moisture content and the desired amount of moisture in the particles on leaving the cooker which is from about 35 to about 50%, giving consideration to some slight condensation of steam in the cooker and the rate of hydrolysis and gelatinization of the particle cereal grains. Thus, with corn grits which may have a moisture content from about 10 to 12%, one part by weight of water to about three parts by weight of corn grits may be required. On the other hand, with rice particles which have a similar or slightly higher moisture content but which hydrolyze and gelatinize more rapidly, one part by weight of water is sufficient to about six parts by weight of rice ground to one-third size.

The total period of cooking is correlated to the conditions of temperature and pressure, moisture content and particle size and the desired condition of the product. Thus for the purpose of our further processing, it is desired that the cooked materials remain in the form of discrete but soft and pliable particles, that is, the particles should substantially retain their identity upon being discharged. The cooking is carried out to an extent where the starches are hydrolyzed and highly dextrinized and the particles are superficially gelatinized with no free starch or white center, and with the particles having a slight adhesive action on each other. Thus, for example, the total cooking time for numbers 6 and 7 size corn grits under the aforementioned conditions is about one and a half hours. With larger sizes such as number 4 grits, the cooking time is longer. On the other hand, particles such as whole to one-third size rice may require pre-steaming for about 15 minutes and final cooking for about 30 minutes. Whole bumped wheat may require 70 minutes cooking whereas particles of about 20 mesh size may require only about 20 minutes. The cooking time of defatted soya bean particles should be such as to cause them to be discharged at the end of the final cooking period in likewise discrete or individual particle form, lightly adhered to the cereal particles. In this case, however, the cooking period for the soya material must be limited to prevent decomposition of the soya proteins by humidification and attendant discoloration and darkening by hydrolysis of the proteins. Under the given cooking conditions, and with the desirability of discharging the cook at the indicated moisture content, it is well to limit the cooking of the soya bean particles to about 20 minutes.

Thus, in accordance with the present process, when two components have a substantially equal cooking time, they may be introduced at the same time to the cooker with the requisite amount of water such as, for example, a mixture of oat groats and whole wheat. On the other hand, in preparing combinations of such materials as corn grits and soya, the corn grits are first cooked alone and the soya particles are subsequently introduced and for the remaining period are jointly cooked with the corn, as will appear in a subsequent specific example. Similar delayed mixing and cooking techniques may be employed for other combinations, as will be apparent from the following specific illustrative examples.

It will be evident that by proceeding in accordance with our process, not only are we enabled to employ particle material which is much cheaper than employing flour, but by proceeding in accordance with our process we may efficiently cook each of the mixed components to the necessary and requisite extent and jointly discharge them from the cooker, as distinguished from the inability to accomplish the same uniform cooking or ability to form wide ranges of mixtures when employing flours, wherein the flours are mixed into the form of a dough and the dough subjected to cooking.

The material upon being discharged from the cooker is thereafter subjected to rolling into thin ribbon or tissue paper-like material to place it in condition for the subsequent steps. Thus, the cooked particle material having a moisture content of about 35 to about 50% is dried to a moisture content of about 25 to 35% by vat drying it at a temperature of about 150° F. If the particles at this stage have become agglomerated into masses or groups, it may be desirable to pass them through a loose grinder to separate them before rolling. The particle material dried to this moisture content is then passed between conventional flaking rolls, but more closely spaced than is conventional in the rolling of flake material such as corn flakes. The moisture content of the material being rolled at this stage is also higher than is conventional in the formation of flaked cereals.

The extent of rolling in accordance with the present invention is such as to entirely destroy the original appearance and identity of the particles, break down their normal cell structure, and reduce them to very thin flakes, preferably less than about .003 inch in thickness, and to an average of about .001 inch in thickness. The rolling to this fine degree of thinness, and aided somewhat by the rate of feed, causes the mixed and adjacent particles to become amalgamated, mixed and blended, and the cell structure crushed so that the material issuing from the rolls is substantially in the form of coherent, smooth surfaced, ribbon-like or greatly enlarged ribbon-flake material. The thinness of the material is such that at this point it is not suitable for toasting or heat-puffing since it lacks body and would char at such temperatures as 400–550° F. employed conventionally for heat-puffing or toasting purposes. For the purpose of flakes which may be heat-puffed or toasted such as corn flakes or the like, the lower limit of thickness is generally about .003 to about .004 inch and the upper limit is conventionally from about .005 to .008 inch. The moisture content at the time of rolling for conventional flakes is about 15 to 20%.

It will thus be seen that our characteristic rolling or ribbon-flaking action is carried out at a moisture content greater than that which is conventional for forming flaked or ribbon material prepared for toasting or heat-puffing. When our material approaches a thickness of about .004, the average corn flake thickness, it is not generally suitable for use in the subsequent step of our present process. Among the reasons for this unsuitability is that rolling to average flake thickness does not adequately weld or disperse and mix the particles with each other, the cell structure is still too pronounced, the flakes are tough, and this thickness does not permit subsequent rapid moisture penetrability and smooth plastic mass formation in the immediately following kneading step. It may, therefore, be said that our material is rolled to a thickness below the average or conventional corn flake thickness, one of the aids for accomplishing this being the indicated employment of relatively high moisture content in the rolling stage, the upper limit of moisture content being such as to inhibit undue adherence of the rolled or ribbon material to the crushing rolls. This material is at this stage unsuitable for heat-puffing or toasting at least by reason of its extreme thinness and lack of cell structure.

The thin ribbon-flake material from the previous step is now in excellent condition for further processing, namely, the formation of a plastic extrudible mass. Due to the thinness of the ribbon material and the intimate distribution of its components, it readily and uniformly absorbs moisture and it may be kneaded in a suitable mechanical kneader with a small amount of added water to bring it up to a moisture content of about 30 to 50%. In about five minutes the material takes the form of a stiff, highly viscous, smooth, plastic mass of a substantially homogeneous character.

This mass may then be shaped into pellets or particles of suitable size desirable for gun-puffing. This may be accomplished by extruding the mass through suitable dies, such as spaghetti, macaroni or the like, or otherwise shaped dies, and cut into suitable lengths such as from about 1/16 to about 1/4 inch or the like, to form generally cylindrical, spherical, tubular, or ring-shaped particles or pellets and the like.

The shaped particles or pellets are then conditioned to a moisture content from about 12 to about 18% so as to provide them with a suitable moisture content for the following step of the process which is explosive or gun-puffing.

These dried particles are placed in a conventional puffing gun such as a rotary retort which is slowly rotated while externally heated so as to bring it up to a steam gauge or super-atmospheric pressure of from about 100 to about 170 pounds per square inch equivalent to an internal temperature of from about 335° F. to about 375° F. Upon reaching a suitable pressure, such as on the average of about 120-140 pounds per square inch gauge equivalent to an internal temperature of about 350-360° F., heating and rotation are stopped and the gun is suddenly opened and the contents explosively discharged into an area of increased volume and lower pressure, such as into the atmosphere, with the resulting particles being enlarged to several times their previous size. Due to their having been previously properly cooked, and by the aid of the heat to which they are subjected in the gun, they are emitted with a pleasing light golden-brown color and substantially of uniform expansion in all directions.

The ability to gun-puff the material at this stage is the result of the cumulative or joint treatment steps of our process. For example, material crushed to conventional flake thickness does not have the ability to be smoothly kneaded, plasticized and extruded to a particle which can stand up under the gun-puffing step, and may become prematurely ruptured and discharged as improperly shaped and charred particles.

By following the steps of our process and the respective general conditions thereof, we have been enabled to employ relatively economical starting materials, process them in an individualized manner, not possible when employing flours and doughs as starting materials, with the result that we have been enabled to form an end product of improved organoleptic properties, enhanced appearance and consumer acceptance.

The following specific examples are illustrative of our process but are not to be considered in limitation thereof:

*Example I*

36.25 pounds of yellow corn grits, sizes 6 and 7, were mixed with 1.2 gallons of water containing 1.07 pounds of salt and cooked for 55 minutes in a rotary steam pressure cooker maintained at 20 pounds per square inch gauge pressure. The cooker was then opened and there was additionally introduced thereto 13.75 pounds of defatted #10 mesh soya bean flakes, the cooker revolved about 5 minutes at 3 R. P. M. to mix the materials, then 0.55 gallon of water containing 0.43 pound of salt were added, the cooker closed and the materials further jointly cooked for 20 minutes while maintaining like steam pressure, as previously, with continued rotation of the cooker to provide mild agitation. The thus jointly cooked admixed material containing 44.6% moisture was discharged in the form of generally discrete particles, that is the particles still retained their identity but particles of soya were lightly adhered to particles of corn. This cooked material was thereafter vat dried at a temperature of 150° F. to a moisture content of 27.5%. The material of the thus reduced moisture content was passed between conventional flaking rolls, the nip of which was closed down to an opening of approximately .001 inch, the rolled material issuing therefrom is the form of coherent and generally continuous ribbon-like strips or larger than conventional flakes. This thinly rolled, tissue paper-like material was then mixed with 1 pint 4 ounces of water and kneaded in a mechanical kneader for 5 minutes to provide a smooth, plastic, homogeneous and highly viscous mass and passed through an extruder to form small shaped pellets having a moisture content of 42.2%. These pellets were vat dried at 130° F. to a moisture content of 16.8% and then tempered for a period of 3 hours. Thereafter the dried and tempered pellets were placed within the chamber of a rotary puffing gun, the gun being heated externally for several minutes until a pressure was developed therein of 130 pounds per square inch gauge, whereupon the gun was opened and the contents explosively discharged into a relatively large chamber communicating with the atmosphere. The resulting products were of uniform appearance and expanded reproductions of the introduced particles and were of a golden-brown color, of a crisp cellular character and of a pleasing taste, the crispness and general shape of the particle holding up well when mixed and eaten with milk.

*Example II*

12.5 pounds of oat groats and 12.5 pounds of whole wheat were mixed with 3 pints of water containing 0.75 pound of salt and jointly introduced to a rotary steam cooker and therein cooked with agitation for a period of 1 hour, the steam pressure being maintained at about 17 pounds per square inch gauge. The jointly cooked admixed material was then discharged with a moisture content of 42.3% and thereafter vat dried at a temperature of 150° F. to a moisture content of 27%. This material was then passed between the closely spaced flaking rolls to produce thin ribbon-flakes of an enlarged character at a thickness of about .003 inch. Four pounds of this rolled material was then mixed with 1 pint of water and kneaded for 5 minutes after which it was passed through an extruder to form annular pellets having a moisture content of 40.7%. These pellets were vat dried at a temperature of 130° F. to a 15% moisture content, tempered for a period of 3½ hours and thereafter subjected to gun-puffing. The rotary puffing gun was heated externally by means of a flame for several minutes until its steam gauge showed a pressure of 140 pounds per square inch, whereupon the contents were discharged explosively to the atmosphere.

*Example III*

12.5 pounds of polished Blue Rose rice was first steamed for 15 minutes at a steam pressure of 17 pounds per square inch, in a perforated pan placed in a rotary steam cooker. After steaming, the rice was removed and 12.5 pounds of white corn grits were placed in the cooker. The corn grits were mixed with 1.5 pints of water containing 0.56 pound of salt and cooked alone for 30 minutes at 20 pounds per square inch steam gauge pressure. The cooker was then opened and the previously steamed rice mixed further with 0.5 pint of water containing 0.9 pound of salt was added, the cooker closed and the mixture of corn and rice then cooked together for 30 minutes more with mild agitation at 17 pounds per square inch steam pressure. The thus cooked mixture was discharged at a moisture content of 41.8% and vat dried at 150° F. to a moisture content of 30%. The material of thus reduced moisture content was first passed through a loose grinder to separate particle clumps to reduce the material to a more generally separate or discrete particle form, after which the generally individualized particle material was passed between closely spaced flaking rolls and rolled out into the form of thin enlarged ribbon-like flakes having a thickness of about .002 inch. This material was then mixed with 2 ounces of water and kneaded for 5 minutes to provide a smooth, plastic, viscous, substantially homogeneous mass and permitted to temper for about 20 minutes to permit equalization of the moisture therethrough. The tempered mass was then passed through an extruder to form macaroni-like or annular shaped pellets having a moisture content of 32.3%. These pellets were vat dried at a temperature of 130° F. to a moisture content of 12.0%, further tempered for a period of 3 hours and thereafter subjected to explosive puffing in a heated gun, as previously, the material in this instance being discharged at 120 pounds per square inch steam gauge pressure.

We claim as our invention:

1. A process of making a ready-to-eat food product of the breakfast cereal type, which comprises rolling an admixture of at least two different cooked coarse particles of the class cereals and legumes to generally coherent ribbon form to blend and amalgamate the cooked particles, masticating the rolled material with added moisture to form a plastic mass, shaping the mass to particles of desired size and drying the particles, and thereafter explosively puffing said dried particles.

2. A process of making a ready-to-eat food product of the breakfast cereal type, which comprises rolling an admixture of at least two different cooked coarse particles of the class cereals and legumes at a moisture content of from about 25% to about 35% to a less than about .003 inch in thickness, to blend and amalgamate the cooked particles to generally coherent ribbon-like form, kneading the rolled material with added moisture to form a smooth, stiff, extrudable plastic mass, extruding said mass to form shaped pellets, drying the pellets and subjecting them to explosive-puffing.

3. A process of making a ready-to-eat food product of the breakfast cereal type, which comprises rolling a cooked admixture of at least two different coarse particles of the class cereals and legumes in generally discrete particle form and while at a moisture content of from about 25% to about 35% to a thickness not greater than about .003 inch, masticating the rolled material with added water to form an extrudable mass, shaping the mass into pellets, drying them to a explosive-puffing moisture content, and subjecting them to gun-puffing.

4. A process of making a ready-to-eat food product of the breakfast cereal type, which comprises rolling a cooked admixture of at least two different coarse particle material of the class cereals and legumes, conditioned to a moisture content of from about 25% to about 35% and in generally discrete particle form, to enlarged generally coherent ribbon character of less than about .003 inch thickness to intimately blend and composite said particles, masticating the rolled material with added water to form a substantially homogeneous plastic extrudable mass, extruding the mass in the form of shaped particles and drying them to a moisture content of from about 12% to about 18%, heating the dried particles under pressure and suddenly releasing the pressure to bring about explosive puffing.

5. A process of making a read-to-eat food product of the breakfast cereal type, which comprises steam cooking at least two different mixed coarse particle material of the class cereals and legumes at a super-atmospheric pressure of from about 15 to about 25 pounds per square inch with added moisture and agitation, discharging the mixed material at a moisture content of from about 35% to about 50% in the form of soft and pliable, but generally discrete particles, reducing the particle material to a moisture content of from about 25% to about 35% and rolling it in said condition to less than average conventional flake thickness to blend and amalgamate the cooked particles, masticating the rolled material with added moisture to form a plastic mass, shaping the mass to pellets and drying them, and thereafter puffing the dried pellets by heating them under pressure and suddenly releasing the pressure explosively.

6. A process of making a read-to-eat food product of the breakfast cereal type, which comprises cooking a mixture of at least two different coarse particle materials of the class cereals and legumes with added moisture at a super-atmospheric pressure of from about 15 to about 25 pounds per square inch and a temperature of from about 250° F. to about 265° F., to soft and pliable form, discharging the mixed cooked material in the form of substantially discrete particles at a moisture content of from about 35% to about 50%, reducing their moisture content to a range of approximately 25% to 35%, and rolling them in such condition to a thickness less than about .003 inch to form generally coherent ribbon-flakes, kneading the rolled material with added moisture to provide a plastic, substantially homogeneous and smooth extrudable mass, shaping the mass to pellets and drying them to a moisture content of from about 12% to about 18%, and explosive-puffing the pellets by heating them in a closed zone to generate a super-atmospheric pressure of from about 100 to about 170 pounds per square inch, and suddenly releasing said pressure to bring about explosive puffing.

JOSEPH J. THOMPSON.
WILLIAM P. PENTY.

REFERENCES CITED

The following references are of record in the file of this patent:

UNITED STATES PATENTS

| Number | Name | Date |
| --- | --- | --- |
| 1,725,171 | Anderson | Aug. 20, 1929 |
| 1,945,946 | McKay | Feb. 6, 1934 |
| 2,162,376 | Collatz | June 13, 1939 |
| 2,295,116 | Kellogg | Sept. 8, 1942 |
| 2,339,419 | McKay | Jan. 18, 1944 |
| 2,388,904 | Collatz | Nov. 13, 1945 |
| 2,421,216 | Penty | May 27, 1947 |
| 2,436,519 | Luke | Feb. 24, 1948 |